US012271891B2

(12) United States Patent
Mestre et al.

(10) Patent No.: US 12,271,891 B2
(45) Date of Patent: *Apr. 8, 2025

(54) SIMULATED CONTACTLESS PAYMENT CARDS PROVIDING MULTIPLE TEMPORARY PROFILES AND CORRESPONDING CREDENTIALS

(71) Applicant: MASTERCARD INTERNATIONAL INCORPORATED, Purchase, NY (US)

(72) Inventors: Patrick Mestre, Sart-Bernard (BE); Florent Hay, Laeken (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/097,776

(22) Filed: Jan. 17, 2023

(65) Prior Publication Data

US 2023/0153790 A1 May 18, 2023

Related U.S. Application Data

(62) Division of application No. 17/025,045, filed on Sep. 18, 2020, now Pat. No. 11,556,918.

(Continued)

(51) Int. Cl.
*G06Q 20/34* (2012.01)
*G06Q 20/22* (2012.01)
(Continued)

(52) U.S. Cl.
CPC ......... *G06Q 20/352* (2013.01); *G06Q 20/227* (2013.01); *G06Q 20/382* (2013.01);
(Continued)

(58) Field of Classification Search
CPC ............ G06Q 20/00–425; G06Q 2220/00–18
See application file for complete search history.

(56) References Cited

U.S. PATENT DOCUMENTS 6,738,873 B2  5/2004  Saltz
8,196,131 B1 *  6/2012  von Behren ........... G06Q 20/02
705/64

(Continued)

FOREIGN PATENT DOCUMENTS

WO   WO-2016136317 A1 *  9/2016 ............. G06F 21/62

OTHER PUBLICATIONS

Kumar, D. A Brief Introduction of Biometrics and Fingerprint Payment Technology, International Journal of Advanced Science and Technology, vol. 4 Mar. 2009 (Year: 2009).*

(Continued)

*Primary Examiner* — Chenyuh Kuo
(74) *Attorney, Agent, or Firm* — Talem IP Law, LLP

(57) ABSTRACT

A bridge service is provided to support multi-user simulated contactless cards that in response to receiving a request to provision a secure element with payment card profile information of a user, provisions a token representing the payment card profile, converts the token representing the payment card profile into a format for the payment application; and provides the payment card profile to the payment application, the payment card profile comprising a single use key. The bridge service enables simulated contactless cards to store payment card information for a user on volatile memory instead of the persistent, secure element memory.

6 Claims, 5 Drawing Sheets

Related U.S. Application Data

(60) Provisional application No. 62/902,592, filed on Sep. 19, 2019.

(51) Int. Cl.
  G06Q 20/38 (2012.01)
  G06Q 20/40 (2012.01)

(52) U.S. Cl.
  CPC ..... G06Q 20/385 (2013.01); G06Q 20/40145 (2013.01); G06Q 2220/00 (2013.01)

(56) References Cited

U.S. PATENT DOCUMENTS

| | | | |
|---|---|---|---|
| 8,589,238 | B2 | 11/2013 | Cooper et al. |
| 9,519,901 | B1* | 12/2016 | Dorogusker ..... G06Q 20/40145 |
| 10,007,909 | B2 | 6/2018 | Collinge et al. |
| 10,235,692 | B2 | 3/2019 | Artman et al. |
| 10,257,185 | B2* | 4/2019 | Wong ................ H04W 12/06 |
| 11,042,857 | B2* | 6/2021 | Yu ...................... G07C 9/00563 |
| 11,295,297 | B1* | 4/2022 | Kushner ............ G06Q 20/3224 |
| 2013/0262317 | A1* | 10/2013 | Collinge ............ G06Q 20/3265 705/72 |
| 2014/0324698 | A1* | 10/2014 | Dolcino ............... G06Q 20/353 705/44 |
| 2015/0140960 | A1* | 5/2015 | Powell ................ H04M 15/755 455/406 |
| 2015/0363765 | A1* | 12/2015 | Alimi ................... G06Q 20/202 705/44 |
| 2016/0078434 | A1* | 3/2016 | Huxham ................ G06Q 20/36 705/71 |
| 2016/0162883 | A1* | 6/2016 | Liscia .................. G06Q 20/363 705/71 |
| 2016/0358172 | A1* | 12/2016 | Ziat ....................... G06Q 20/227 |
| 2017/0308895 | A1 | 10/2017 | Srivastava et al. |
| 2017/0344732 | A1* | 11/2017 | Kohli ................. G06Q 20/2295 |
| 2017/0352026 | A1* | 12/2017 | Musil ................... G06Q 20/382 |
| 2018/0006821 | A1 | 1/2018 | Kinagi |
| 2018/0089691 | A1* | 3/2018 | Sibert .................... H04L 9/3231 |
| 2019/0034934 | A1* | 1/2019 | Trelin ................... B66B 1/3407 |
| 2020/0058032 | A1* | 2/2020 | Lad .................... G06V 40/1365 |

OTHER PUBLICATIONS

"International Search Report and Written Opinion Issued in International Patent Application No. PCT/US2020/051372", Mailed Date: Dec. 6, 2020, 8 Pages.

Non-Final Office Action issued in U.S. Appl. No. 17/025,045, mailed May 20, 2022, 19 pages.

Dileep Kumar et al. "A Brief Introduction of Biometrics and Fingerprint Payment Technology" International Journal of Advanced Science and Technology, Mar. 2009, 15 pages, vol. 4.

Notice of Allowance issued in U.S. Appl. No. 17/025,045, mailed Sep. 15, 2022, 15 pages.

* cited by examiner

SIMULATED CONTACTLESS PAYMENT CARDS PROVIDING MULTIPLE TEMPORARY PROFILES AND CORRESPONDING CREDENTIALS

CROSS-REFERENCE TO RELATED APPLICATIONS

This application is a division of U.S. patent application Ser. No. 17/025,045, filed Sep. 18, 2020, which claims the benefit of U.S. Provisional Patent Application Ser. No. 62/902,592, filed Sep. 19, 2019.

BACKGROUND

A contactless card is usually dedicated to a single user. An issuer provisions (customizes) a card for a particular cardholder and the card is then issued to the cardholder, with the personalization credentials stored in a secure element. The personalization credentials include a personal account number (PAN) along with keys unique to the cardholder. These data remain unchanged during the card lifetime and so do not need to be updated on a transaction basis. The secure element usually includes a persistent memory (e.g., non-volatile memory such as EEPROM) in which the personalization credentials are stored. The personalization credentials are usually only updated when the card expires, thus not very often.

BRIEF SUMMARY

Simulated contactless payment cards providing multiple temporary profiles and corresponding credentials are described.

A bridge service is provided to support simulated contactless cards, for example, in point of sale (POS) systems, so that many customers can use the same device/application for simulating their contactless card. The bridge service supports the simulated contactless cards by, in response to receiving a request to provision a secure element with payment card profile information of a user, provisioning a token representing the payment card profile, converting the token representing the payment card profile into a format for the payment application; and providing the payment card profile to the payment application. The payment card profile can include a single use key.

A POS system that takes contactless payments can be configured to also take simulated contactless cards either through retrofitting (e.g., via a dongle running a multi-user simulated contactless payment card application that uses the bridge service) or via an integrated simulator system that runs the multi-user simulated contactless payment card application that uses the bridge service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Simulated contactless payment cards providing multiple temporary profiles and corresponding credentials are described.

A bridge service, which may also be referred to herein as a provisioning service, is provided to support simulated contactless cards, for example, in point of sale (POS) systems that include a secure element or have a secure element within near field communication range. A POS system that takes contactless payments can be configured to also take simulated contactless cards either through retrofitting (e.g., via a dongle running a multi-user simulated contactless payment card application that uses the bridge service) or via a simulator system that is integrated with the POS system and runs the multi-user simulated contactless payment card application that uses the bridge service. When the contactless payment device is in the form of a dongle, there is no change to the merchant terminal infrastructure itself, just the addition of the dongle in front of the contactless reader. The dongle can thus act as a contactless card for the merchant contactless terminal. The dongle does not need to make physical contact with the merchant terminal/POS system so long as the dongle is able to be in communication with a contactless card reader of the merchant terminal/POS system. It should be understood that, although reference is made to a POS system, the implementation of the system may be akin to any point of interaction (POI) terminal or other interface for payment.

Figure 1:
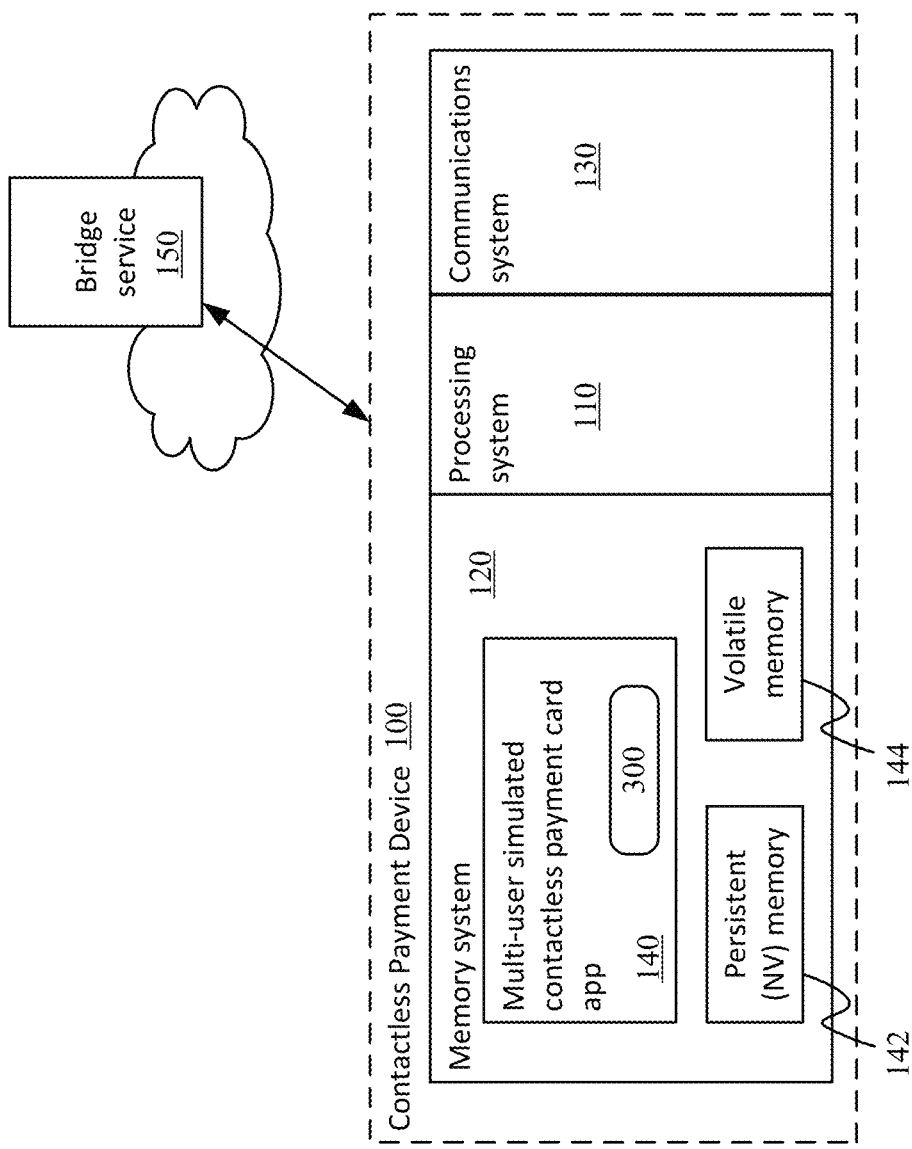
FIG. 1 illustrates an example operating environment for simulated contactless payment cards providing multiple temporary files and corresponding credentials.

FIG. 1 illustrates an example operating environment for simulated contactless payment cards providing multiple temporary files and corresponding credentials. Referring to FIG. 1, a contactless payment device 100, which may be in the form of a dongle or integrated with a POS system, can include a processing system 110, a memory system 120, and a communications system 130.

The processing system can include any suitable processing devices, such as a microprocessor, central processing unit (CPU), graphics processing unit (GPU), field programmable gate arrays (FPGAs), application-specific integrated circuits (ASICs), logic circuits, and state machines.

The memory system 120 can include volatile (e.g., dynamic random access memory (DRAM), static random access memory (SRAM)) and non-volatile memory (e.g., flash, magnetic random access memory (MRAM, FeRAM)). Non-volatile memory can be used as persistent memory since non-volatile memory does not require power to maintain the stored information. The memory of memory system 120 may be removable or non-removable.

Figure 3:
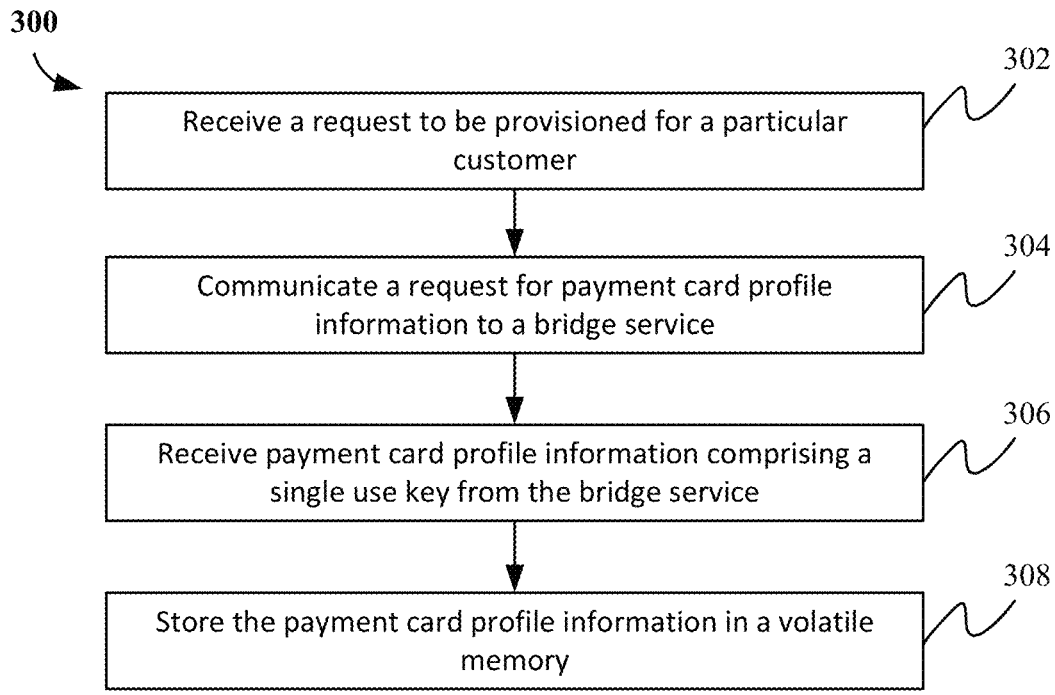
FIG. 3 illustrates an example process carried out by a multi-user simulated contactless payment card application.

As illustrated in the example of FIG. 1, the memory system 120 stores a multi-user simulated contactless payment card application 140, which may carry out process 300 such as described with respect to FIG. 3. The application 140 may be stored in any suitable type of memory of the memory system 120. Memory system 120 at least includes a non-volatile memory 142 and a volatile memory 144. At least a portion of the non-volatile memory 142 is part of a secure element part of the contactless payment device 100. It should be noted that although one non-volatile memory 142 and one volatile memory 144 are shown, the contactless payment device 100 may utilize one or more memory circuits/chips for that memory type.

Communications system 130 includes the interfaces and logic for communicating over various networks such as via short range wireless connectivity (e.g., near field communication (NFC)), via radio frequency protocols (e.g., Bluetooth, Wi-Fi using IEEE standards 802.11, cellular data protocols using GSM, CDMA, 3G, 4G, 5G etc., satellite), and via wired connections (e.g., ethernet). The particular types of communications available via communications system 130 depends on implementation.

Communications system 130 enables contactless payment device 100 to communicate with bridge service 150 and to communicate with a point of sale terminal (when not integrated as part of the point of sale terminal) for the transaction.

The contactless payment device 100 equipped with a secure element (including non-volatile memory 142) can be located within a communication distance to a merchant's contactless reader of a point of sale terminal. Instead of each individual user having their own contactless payment device, the contactless payment device 100 is available for use by any customer.

Unlike in the conventional contactless payment device or card, which belongs to a specific cardholder and can store credentials in the secure element/non-volatile memory, the described contactless payment device 100 is used for effectively any customer.

In operation, when a customer wants to pay, the customer is first identified by the contactless payment device 100 or an identification device (e.g., a palm reader) (not shown), for example, using biometrics or some other mechanism that can identify (and optionally authenticate) a customer. Once the customer is identified, the device 100 is personalized so as to behave like a contactless card (or mobile application) of this customer and the payment takes place. For example, once the customer is identified, the bridge service 150 can provide to the device 100 the single-use contactless card belonging to the authenticated user. The device 100 can be used with existing contactless terminals, communicate with a terminal via Bluetooth or other communication protocol, or be part of a payment terminal (e.g., integrated with the POS system).

The bridge service 150 is provided to support multiple temporary profiles and corresponding credentials on the contactless payment device 100. To provision the secure element with cardholder's specific data (e.g., card profile data including PAN and keys—and other EMV data), the contactless payment device 100 uses the described bridge service 150. The contactless payment device 100 (e.g., directed by the multi-user simulated contactless payment card application 140) calls the service 150 and the service 150 sends the card details (e.g., PAN, keys, other EMV data such as card country code, currency code, certificates, etc.) to the contactless payment device 100 in response to the request. The keys that will be used for the transaction are single use, and they can only be used for one transaction. This is to be opposed to a conventional secure element implementation where the personalized keys are usually the card master keys that are multi use.

The bridge service 150 can be a hybrid between certain features of a digital enablement service, such as provided by a remote provisioning system (examples include the Mastercard Digital Enablement Service and the Visa Digital Enablement Program and Visa Token Service), and certain features of a mobile payment solution, such as provided by a cloud-based payments solution (examples include the Mastercard Cloud-Based Payments services and the Visa Cloud-Based Payments services). The hybrid approach can use card profile data (token credential) that is transferred during token provisioning via a digital enablement service to a Wallet Server of a mobile payment solution that extracts the data elements and pushes the extracted data elements to the multi-user simulated contactless payment card application to enable the contactless transactions.

In a conventional secure element/contactless payment card/application implementation, a personalization sequence takes place between a Trusted Service Manager (e.g., a digital enablement service) and the payment application. A secure channel is opened between these two entities, and the personalization data is received (card profile and credentials) and stored in the persistent memory of the secure element. However, this approach has challenges if the secure element needs to be updated repeatedly such as is the case for multi-user scenarios. In particular, the secure element's persistent memory (where the card profile is conventionally stored) has a limitation in the number of writing cycles. After too many cycles, the persistent memory can be fatally damaged such that the secure element does not work anymore. This is not a problem when the secure element belongs to a particular cardholder, as it is unlikely that the particular cardholder would delete and re-add cards multiple times a day (e.g., a hundred or more times per day such as possible when the contactless payment device is used for each customer at a merchant's point of sale terminal/contactless reader). In contrast, the described contactless payment device 100 may be used for all payments at a terminal, whoever the customer, so card profiles are added and deleted possibly hundreds of times a day.

Accordingly, to avoid degrading a secure element's persistent memory (e.g., non-volatile memory 142) and improve usability of a secure element (such as provided by contactless payment device 100), cardholder profiles are stored temporarily in non-persistent memory, such as volatile memory 144, which does not have the same limitation on the number of writing cycles before the memory becomes irremediably damaged. In addition, whenever there is a transaction (which requires provisioning of a cardholder profile), no writing is required to persistent memory (e.g., non-volatile memory 142).

The multi-user simulated contactless payment card application 140 can be implemented as part of a smart card computing environment, such as the Java Card Platform, on which an applet is run. In such an environment, there are two forms of transient memory that are supported:

CLEAR_ON_DESELECT memory: the data are kept in volatile memory (e.g., volatile memory 144) while the application remains selected. That memory is cleared when the application is deselected.

CLEAR_ON_RESET memory: the data are kept in volatile memory while the secure element remains powered on. That memory is reset once the secure element is rebooted. The amount of such memory must be declared at the application installation and is limited per application.

For contactless payment devices that are implemented with a computing environment such as the Java Card Platform, the cardholder profile can be stored in volatile memory 144 using CLEAR_ON_DESELECT memory.

Figure 2:
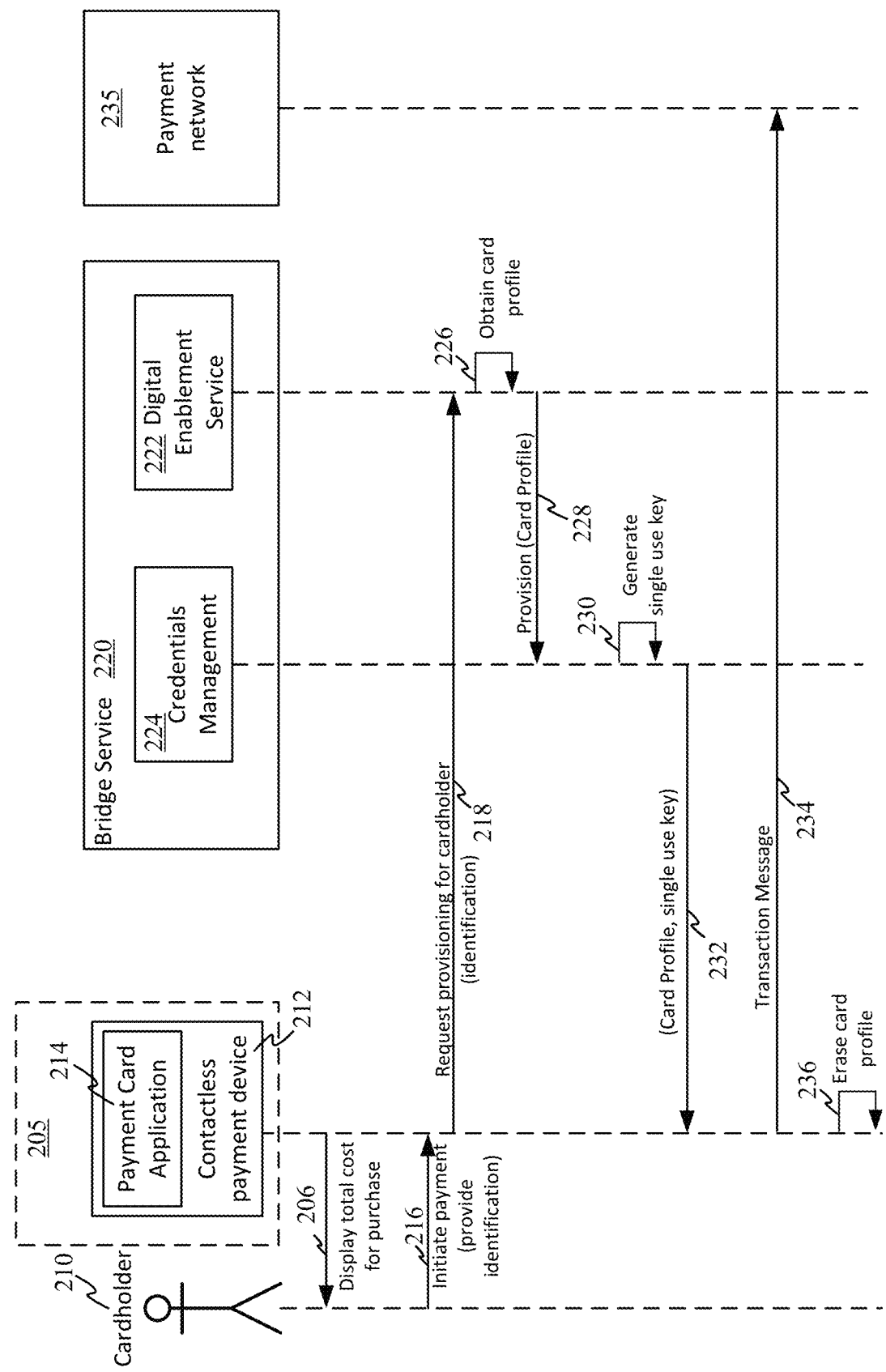
FIG. 2 illustrates an example process flow for payment via multi-user simulated contactless payment cards.

FIG. 2 illustrates an example process flow for payment via multi-user simulated contactless payment cards. The scenario illustrated in FIG. 2 can begin at a terminal 205 for a merchant, which may display (206) a total cost for purchase to a cardholder 210 and include or have associated therewith a contactless payment device 212 with multi-user simulated contactless payment card application 214. The cardholder can initiate (216) payment via the contactless payment device 212 with multi-user simulated contactless payment card application 214. For example, when a customer wants to pay, the customer can initiate the transaction by identifying themselves to the payment device 212, using a biometric or other mechanism that can identify (and optionally authenticate) the customer. The initiation of the transaction includes a request for the contactless payment device to be provisioned for that particular customer.

In response to the request for the contactless payment device to be provisioned for that particular customer, the contactless payment device 212, directed by the multi-user simulated contactless payment card application 214, can use the identification of the customer to personalize and behave like a contactless card (or mobile application) of this customer, for example, following process 300 described with respect to FIG. 3. For the example implementation of the scenario shown in FIG. 2, the identification information (e.g., biometric) is communicated (218) to a bridge service 220 with the request for the provisioning. The bridge service 220 may authenticate the customer in addition to performing the provisioning or may receive, for example, a result of an authentication occurring at the terminal 205 or by another service as part of the request for provisioning (which also includes identification information so that appropriate credentials can be obtained).

Figure 4:
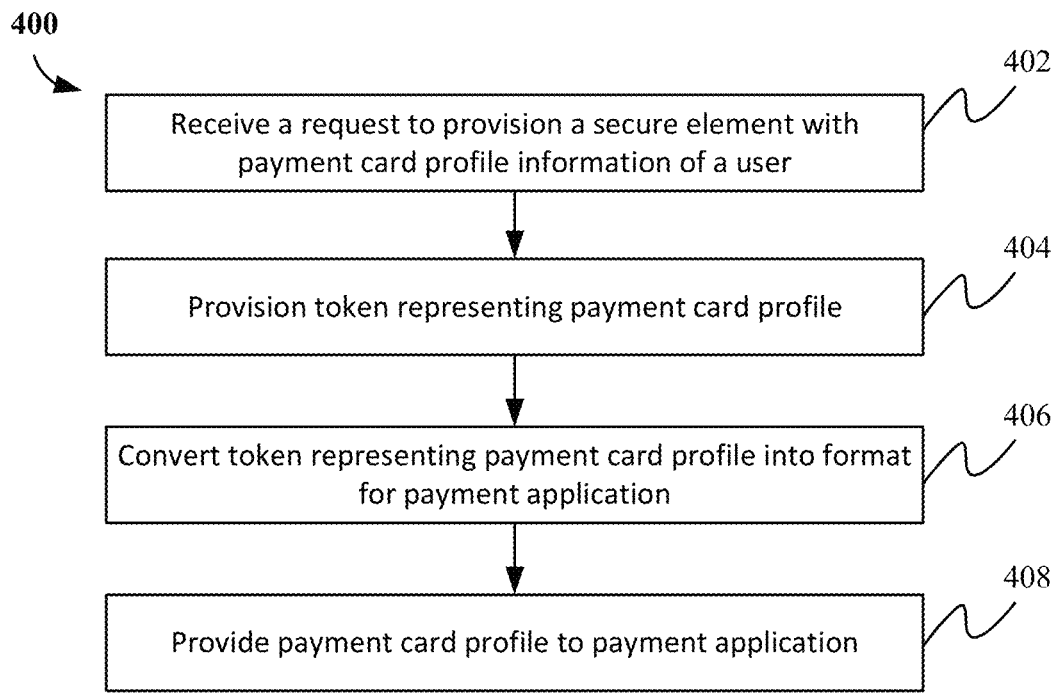
FIG. 4 illustrates an example process for supporting contactless payment cards providing multiple temporary profiles and corresponding credentials.

The bridge service 220 may perform process 400 such as described with respect to FIG. 4. Here, the bridge service 220 includes a digital enablement service 222 and a credentials management service 224. The digital enablement service 222 can receive the information of the cardholder 210 and obtain (226) the card profile of the cardholder 210. Instead of communicating the card profile and credentials to the contactless payment device 212, the digital enablement service 222 of the bridge service 220 provides (228) the card profile to the credentials management service 224 of the bridge service 220. The credentials management service 224 generates (230) a single use key, generates a message with the card profile and single use key in the appropriate format for the payment card application, and communicates (232) the message with card profile and single use key to the contactless payment device 212.

When the payment application 214 receives the message from the credentials management service 224 of the bridge service 220, the payment application 214 stores the information (e.g., token credentials) to enable a contactless transaction. The information can be stored on volatile memory (e.g., volatile memory 144 of FIG. 1).

The information of the cardholder (e.g., token credentials) can be used at the terminal 205 via the contactless payment device 212 to perform the transaction, communicating (234) a transaction message to a payment network 235 (e.g., merchant acquirer, payment network, issuer, etc.). Once payment is complete, the credentials at the payment device 212 are erased (236).

FIG. 3 illustrates an example process carried out by a multi-user simulated contactless payment card application. Referring to FIG. 3, a process 300 can begin when a customer attempts to pay with a simulated contactless card via a contactless payment device (e.g., contactless payment device 100). The contactless payment device can be personalized (e.g., provisioned) so as to behave like a contactless card for that customer. The contactless payment device can receive (302) a request to be provisioned for a particular customer. This request to be provisioned may be part of or subsequent to authentication (e.g., via a biometric) of the user at the contactless payment device (or via an independent authentication device that can securely push the result of the authentication to the bridge service). The contactless payment device can communicate (304) a request for payment card profile information to the bridge service; and the simulated contactless card can receive (306) payment card profile information from the bridge service. The request for payment card profile information can include account information obtained from the authentication of the user. The payment card profile information received from the bridge service includes a single use key. The single use key refers to a key that can only be used for one transaction, which is opposite to the conventional secure element implementation where the personalized keys are usually the card master keys that are multi use. The payment card profile information can also include a personal account number (PAN). The contactless payment device can store (308) the payment card profile information in a volatile memory (e.g., the volatile memory 144 of FIG. 1).

FIG. 4 illustrates an example process for supporting contactless payment cards providing multiple temporary profiles and corresponding credentials. Referring to FIG. 4, process 400 can include receiving (402) a request to provision a secure element with payment card profile information of a user. The request can be sent from a payment application such as multi-user simulated contactless payment card application 140 as described with respect to FIG. 1. In response to the request, the method can include provisioning (404) a token representing the payment card profile. The provisioning 404 may be carried out by a digital enablement services component such as described with respect to FIG. 5. The method can continue with converting (406) the token representing the payment card profile into a format for the payment application; and providing (408) the payment card profile to the payment application.

Figure 5:
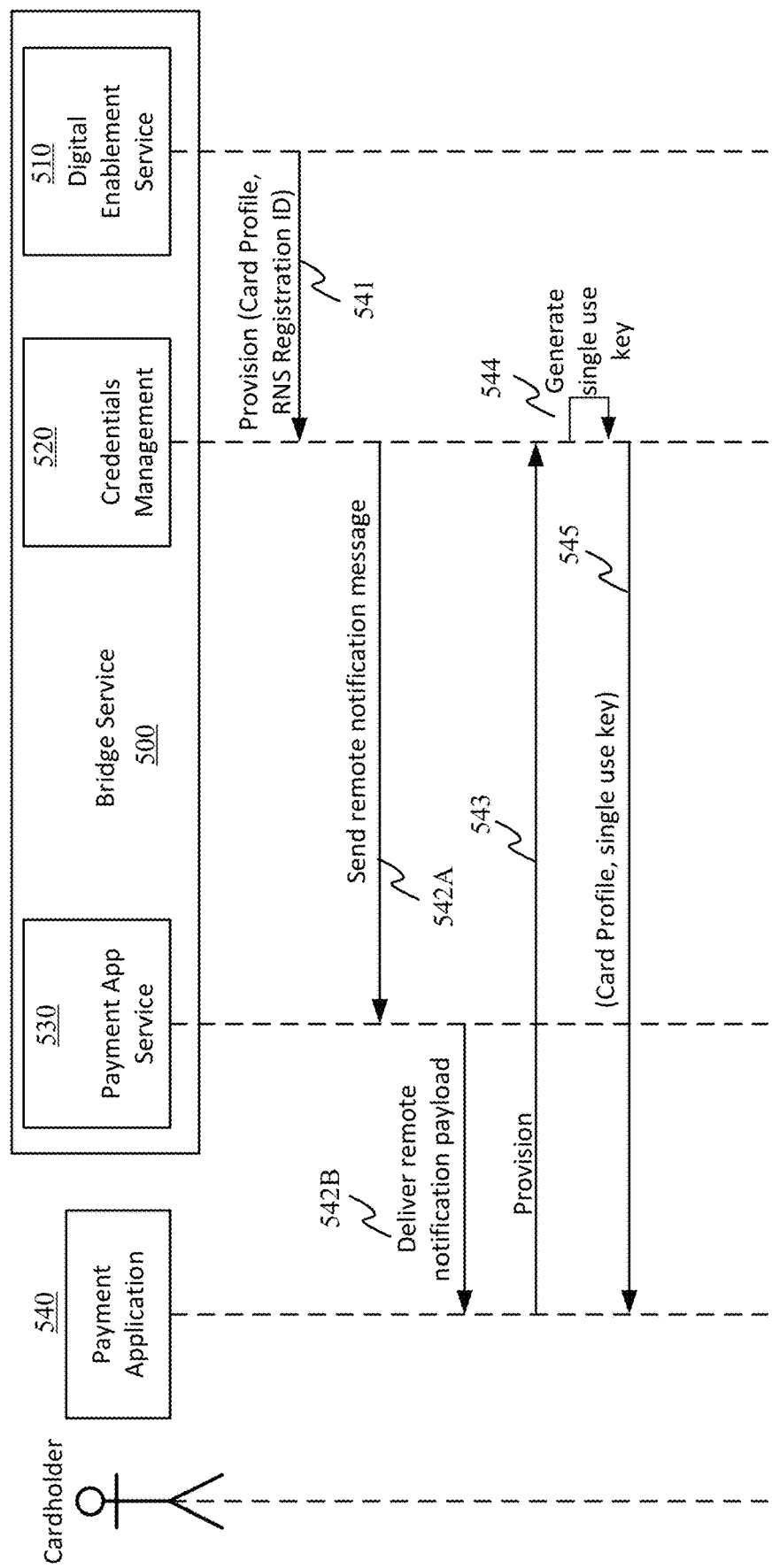
FIG. 5 illustrates example processes carried out by a bridge service supporting contactless payment cards providing multiple temporary profiles and corresponding credentials according to an example implementation.

FIG. 5 illustrates example processes carried out by a bridge service supporting contactless payment cards providing multiple temporary profiles and corresponding credentials according to an example implementation. In the example of FIG. 5, an initial provisioning flow carried out at a bridge service 500 is shown. Here, the bridge service is illustrated as including three components: a digital enablement service 510, a credentials management service 520, and a payment application service 530. A payment application 540, which may be an implementation of multi-use simulated contactless payment card application 140 of FIG. 1, communicates with the various service components of the bridge service to support multi-user contactless payments.

Referring to FIG. 5, an initial provisioning process begins with provisioning (541) of a card profile from the digital enablement service 510 to the credentials management service 520. The card profile can be in the form of any suitable predefined syntax text file such as XML and JSON. For example, the card profile can be a JSON object that constitutes the token credential. In some cases, the digital enablement service 510 can initially deliver the card profile structure to the credentials management service 520 in the provision request message from a Credentials Management API. The card profile object is part of the payload of the encrypted data field in the request message.

In some cases, the provisioning in operation 541 for the initial provisioning process is carried out in response to receiving a first communication from the payment application 540, where the first communication indicates the user (and this communication may include information used to authenticate the user).

The digital enablement service 510 tokenizes existing account PANs held on file, replacing each PAN with a unique token (subject to issuer participation). These tokens can be used for e-commerce transactions, in-app transactions, and the described multi-user simulated contactless card transactions. The token credentials can come without the session keys needed during the transaction. The credential management service 520 converts the card profile into a format understandable by the payment application 540. For example, the syntax text file of the card profile may be provisioned into SCP03 data blocks and a Secure Channel SCP03 can be opened with the Security Domain of a GlobalPlatform Secure Element. In some cases, the credentials management service is hosted on a Wallet Server.

The credentials management service 520 extracts the needed data elements from the card profile and pushes these extracted data elements to the payment application 540 via the payment application service 530. The credentials management service 520 can derive a single use key from a card master key. In the illustrated example, the credentials management service 520 notifies (542A, 542B) the payment application 540 via the payment application service 530 of the provisioning. The payment application 540 can then request (543) the credentials from the credentials management service 520 which generates (544) a single use key and provides (545) the card profile and single use key in the appropriate format for the payment application 540. For example, the credentials management service 520 transfers the converted card profile structure (e.g., DGI 8000 format) to the target payment application instance (e.g., payment application 540) after extracting the needed data elements. The request 543 may be considered a second communication indicating a request responding to the notification of an available payment card profile of the user.

Figure 6:
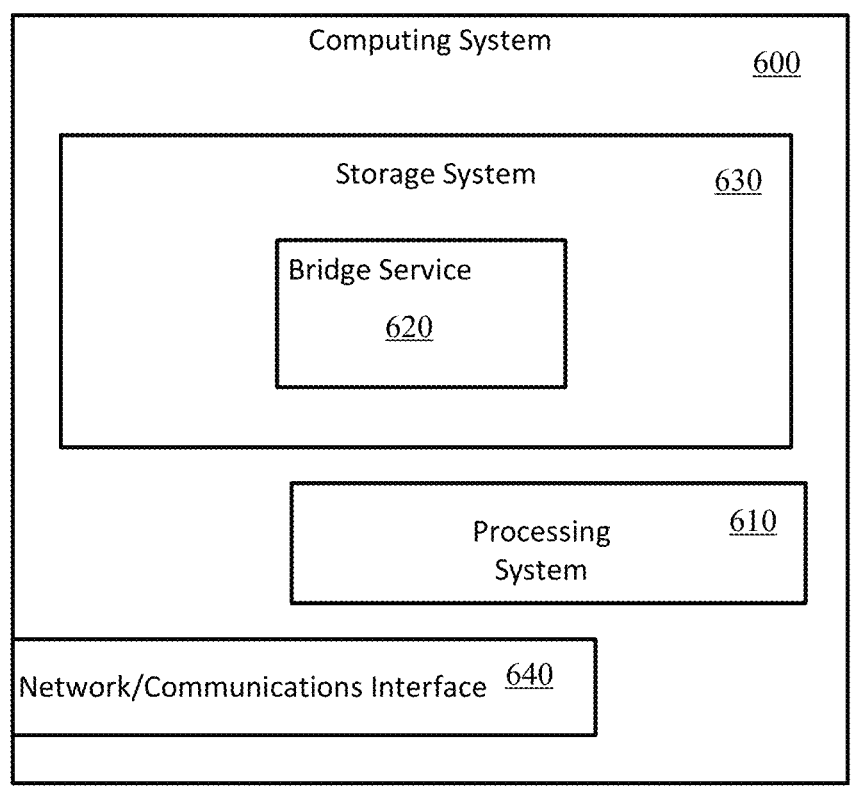
FIG. 6 illustrates components of a computing system that may provide a bridge service as described herein.

FIG. 6 illustrates components of a computing system that may provide a bridge service as described herein. Referring to FIG. 6, system 600 may be implemented within a single computing device or distributed across multiple computing devices or sub-systems that cooperate in executing program instructions. The system 600 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 600 can include a processing system 610, which may include one or more processors and/or other circuitry that retrieves and executes software for bridge service 620 from storage system 630. Processing system 610 may be implemented within a single processing device but may also be distributed across multiple processing devices or sub-systems that cooperate in executing program instructions.

Storage system(s) 630 can include any computer readable storage media readable by processing system 610 and capable of storing software for the bridge service 620. Storage system 630 may be implemented as a single storage device but may also be implemented across multiple storage devices or sub-systems co-located or distributed relative to each other. Storage system 630 may include additional elements, such as a controller, capable of communicating with processing system 610. Storage system 630 may also include storage devices and/or sub-systems on which data is stored. System 600 may access one or more storage resources in order to obtain information to carry out any of the processes indicated by bridge service 620.

Software for the bridge service 620, including routines for performing processes such as described with respect to services 510, 520, and 530 of FIG. 5 and process 400 described with respect to FIG. 4 may be implemented in program instructions and among other functions may, when executed by system 600 in general or processing system 610 in particular, direct the system 600 or processing system 610 to operate as described herein.

Communication interface 640 may be included, providing communication connections and devices that allow for communication between system 600 and other computing systems (not shown) over a communication network or collection of networks (not shown) or the air.

In embodiments where the system 600 includes multiple computing devices, the system 600 can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

In some embodiments, system 600 may host one or more virtual machines.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method using a system of a bridge service, wherein the bridge service supports multiple temporary payment card profiles on a contactless payment device and comprises a digital enablement service and a credentials management service, wherein the contactless payment device comprises a secure element, a multi-user simulated contactless payment card application, and a volatile memory, the method comprising:
receiving, by the system via the digital enablement service and from the contactless payment device, a first request to provision the secure element of the contactless payment device with a first payment card profile of a first user for a first payment transaction, wherein the first request comprises a first identification information of the first user initiating the first payment transaction;
obtaining, by the system via the digital enablement service, the first payment card profile of the first user based on the received first identification information;
provisioning, by the system via the digital enablement service to the credentials management service, a first token comprising information of the first payment card profile of the first user;
converting, by the system via the credentials management service, the first payment card profile from the first token into a format for the multi-user simulated contactless payment card application, wherein the converting further comprises extracting first data elements from the first payment card profile;
generating, by the system via the credentials management service, a first single use key for the payment transaction;
communicating, by the system via the credentials management service and to the contactless payment device, the converted first payment card profile comprising the first single use key, wherein the contactless payment device stores the information of the first payment card profile in the volatile memory and erases the information of the first payment card profile from the volatile memory upon completion of the first payment transaction with a payment network;
receiving, by the system via the digital enablement service and from the contactless payment device, a second request to provision the secure element of the contactless payment device with a second payment card profile of a second user for a second payment transaction, wherein the second request comprises a second identification information of the second user initiating the second payment transaction;
obtaining, by the system via the digital enablement service, the second payment card profile of the second user based on the received second identification information;
provisioning, by the system via the digital enablement service to the credentials management service, a second token comprising information of the second payment card profile of the second user;
converting, by the system via the credentials management service, the second payment card profile from the second token into the format for the multi-user simulated contactless payment card application, wherein the converting further comprises extracting second data elements from the second payment card profile;
generating, by the system via the credentials management service, a second single use key for the payment transaction; and
communicating, by the system via the credentials management service and to the contactless payment device, the converted second payment card profile comprising the second single use key, wherein the contactless payment device stores the information of the second payment card profile in the volatile memory and erases the information of the second payment card profile from the volatile memory upon completion of the second payment transaction with the payment network.

2. The method of claim 1, further comprising authenticating, by the system, the first user before provisioning the first token.

3. The method of claim 2, wherein the first identification information of the first user comprises a biometric of the first user.

4. The method of claim 1, wherein receiving the first request to provision the secure element with the payment card profile information of the first user comprises:
receiving, by the system a first communication indicating the first user; and
receiving, by the system, a second communication indicating a request responding to a notification of an available payment card profile for the first user, wherein the first single use key is provided in response to the second communication.

5. The method of claim 1, further comprising:
authenticating, by the system, the second user before provisioning the second token.

6. The method of claim 1, wherein the first single use key is a key that can only be used for the first payment transaction.

* * * * *